United States Patent
Valencic et al.

(10) Patent No.: US 11,838,585 B2
(45) Date of Patent: *Dec. 5, 2023

(54) DETECTING AN OPERATIONAL STATE OF A MEDIA DEVICE

(71) Applicant: The Nielsen Company (US), LLC, New York, NY (US)

(72) Inventors: Bostjan Valencic, Koper (SI); Igor Sotosek, Portoroz (SI)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,126

(22) Filed: Dec. 5, 2022

(65) Prior Publication Data

US 2023/0094632 A1    Mar. 30, 2023

Related U.S. Application Data

(63) Continuation of application No. 17/529,792, filed on Nov. 18, 2021, now Pat. No. 11,523,178.

(60) Provisional application No. 63/116,620, filed on Nov. 20, 2020.

(51) Int. Cl.
*H04N 21/442* (2011.01)
*H04N 21/4363* (2011.01)

(52) U.S. Cl.
CPC ... *H04N 21/4424* (2013.01); *H04N 21/43635* (2013.01)

(58) Field of Classification Search
None
See application file for complete search history.

(56) References Cited

U.S. PATENT DOCUMENTS

| | | |
|---|---|---|
| 9,717,007 B2 | 7/2017 | Lee et al. |
| 11,523,178 B2 | 12/2022 | Valencic et al. |
| 2009/0040923 A1 | 2/2009 | Bantukul et al. |
| 2009/0046205 A1 | 2/2009 | Strasser et al. |

(Continued)

FOREIGN PATENT DOCUMENTS

| | | | |
|---|---|---|---|
| EP | 1736867 A2 * | 12/2006 | ............... G06F 3/14 |
| EP | 1736867 A2 | 12/2006 | |

(Continued)

OTHER PUBLICATIONS

International Searching Authority, "International Preliminary Report on Patentability," mailed in connection with International Patent Application No. PCT/US2021/060092, dated Jun. 1, 2023, 7 pages.

(Continued)

*Primary Examiner* — William J Kim

(57) ABSTRACT

Example methods, apparatus, systems and articles of manufacture (e.g., physical storage media) to detect an operational state (such as an on/off state) of a media device are disclosed herein. Disclosed example apparatus are to monitor for activity on a first bus of an (HDMI) port of the media device. Disclosed example apparatus are also to inject a message with a first address on the first bus in response to detection of no activity on the first bus for at least a threshold duration. Disclosed example apparatus are further to detect the operational state of the media device based on whether a response to the message is received on the first bus.

24 Claims, 11 Drawing Sheets

(56) References Cited

U.S. PATENT DOCUMENTS

2009/0150582 A1     6/2009  Diefenbaugh
2009/0307734 A1*    12/2009 Doi ..................... G09G 5/006
                                                   725/105
2014/0006652 A1     1/2014  Chen et al.
2016/0127924 A1     5/2016  Lee et al.
2020/0186876 A1*    6/2020  Eluard ............. H04N 21/43635

FOREIGN PATENT DOCUMENTS

EP          3331248 A1 *   6/2018  ........... G06F 1/3206
EP          3331248 A1     6/2018
KR    1020160052281 A      5/2016

OTHER PUBLICATIONS

International Searching Authority, "International Search Report," mailed in connection with International Patent Application No. PCT/US2021/060092, dated Mar. 10, 2022, 3 pages.

International Searching Authority, "Written Opinion," mailed in connection with International Patent Application No. PCT/US2021/060092, dated Mar. 10, 2022, 5 pages.

United States Patent and Trademark Office, "Notice of Allowance and Fee(s) Due," dated Aug. 3, 2022, in connection with U.S. Appl. No. 17/529,792, 7 pages.

* cited by examiner

DETECTING AN OPERATIONAL STATE OF A MEDIA DEVICE

RELATED APPLICATION(S)

This patent arises from a continuation of U.S. patent application Ser. No. 17/529,792, which is titled "DETECTING AN OPERATIONAL STATE OF A MEDIA DEVICE," and which was filed on Nov. 18, 2021, which claims the benefit of U.S. Provisional Application No. 63/116,620, which is titled "DETECTING ON/OFF STATE OF A MEDIA DEVICE," and which was filed on Nov. 20, 2020. Priority to U.S. patent application Ser. No. 17/529,792 and U.S. Provisional Application No. 63/116,620 is claimed. U.S. patent application Ser. No. 17/529,792 and U.S. Provisional Application No. 63/116,620 are hereby incorporated by reference in their respective entireties.

FIELD OF THE DISCLOSURE

This disclosure relates generally to media device monitoring and, more particularly, to detecting an operational state of a media device.

BACKGROUND

Audience measurement systems typically include one or more site meters to monitor the media presented by one or more media devices located at a monitored site. In some arrangements, the monitored media device may receive media from one or more media sources, such as, but not limited to, a set-top box (STB), a digital versatile disk (DVD) player, a Blu-ray Disk™ player, a gaming console, a computer, etc., which are powered independently from the monitored media device. Accordingly, there is the possibility that, although a media source at the monitored site is powered on and providing media to the monitored media device, the monitored media device may be powered off and, thus, not actively presenting the media provided by the media source. Therefore, to enable accurate crediting of media exposure at the monitored site, some site meters further monitor the operational state of the monitored media device to determine whether the media device is powered off and not capable of presenting media, or powered on and capable of presenting media.

Figure 1:
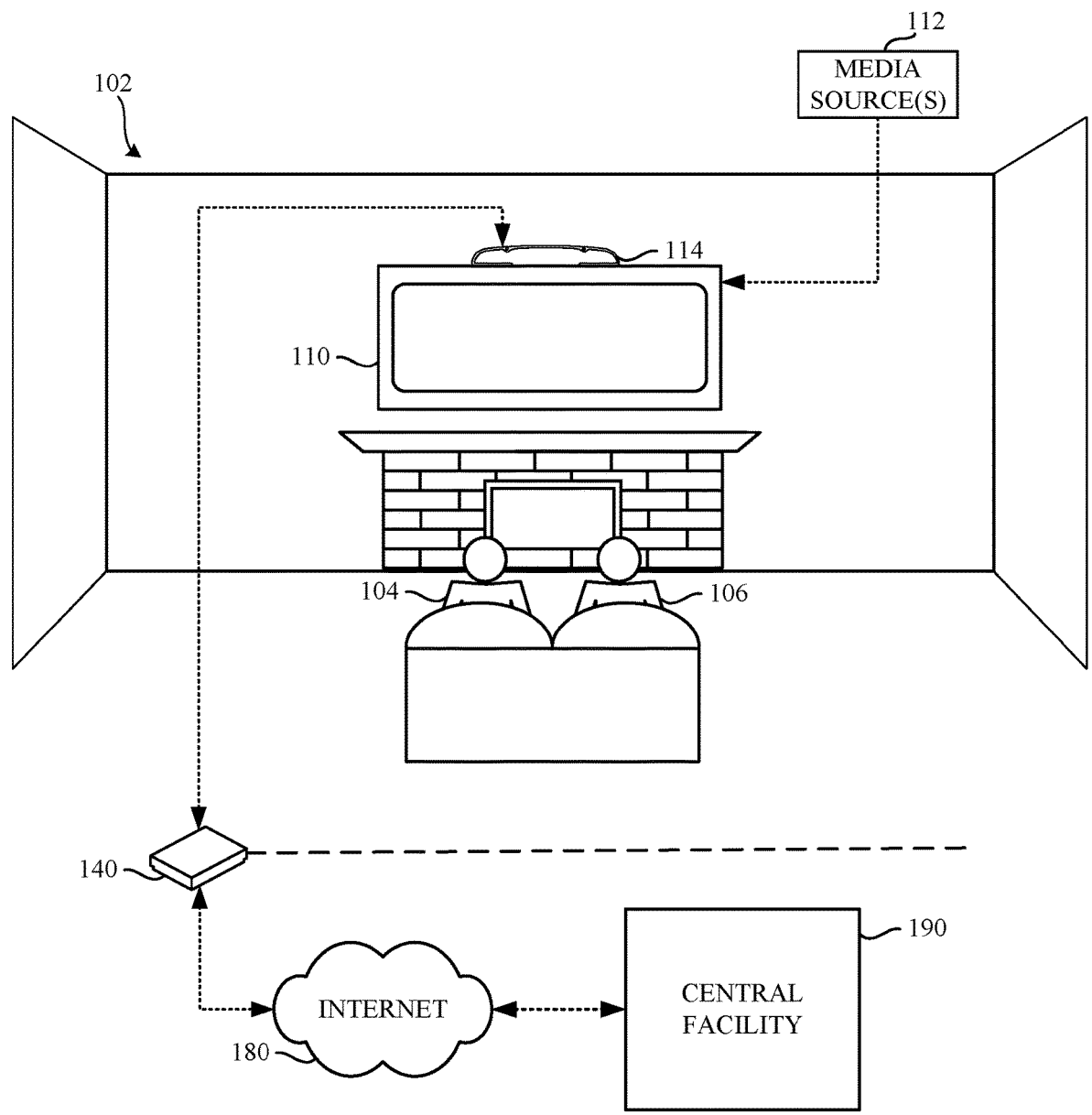
FIG. 1 is a block diagram of an example system including an example device meter constructed to detect an operational state of a media device in accordance with the teachings of this disclosure.

In general, the same reference numbers will be used throughout the drawing(s) and accompanying written description to refer to the same or like parts, elements, etc. The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Example methods, apparatus, systems and articles of manufacture (e.g., physical storage media) to detect an operational state (such as an on/off state) of a media device are disclosed herein. Modern media devices, such as flat-screen televisions (TVs), have very low power consumption. As such, conventional media device state detection techniques that are based on differentiation of the different power states associated with respective different media device (e.g., a monitored TV) states are becoming more and more difficult to calibrate and, thus, are potentially unreliable. High-definition multimedia interface (HDMI) ports are commonly available on modern TVs and other media devices, but the level of integration of HDMI features across media devices (e.g., TVs) from different manufacturers, and/or across different models of the same manufacturer, is inconsistent. A typical HDMI port includes several data buses, such as consumer electronics control (CEC) and display data channel (DDC) busses, with associated logical layer protocols that provide software commands that can report media device (e.g., TV) state. However, because the HDMI standard has been evolving over many years, commercially available media devices (e.g., TVs) have different levels of integration of the CEC and DDC specifications. This means that a media device state detection technique utilizing HDMI port monitoring may be unable to rely on, for example, a monitored TV answering a "TV State" CEC query signaled over the HDMI port, as that command might not have been implemented yet in the HDMI protocol stack of the particular monitored TV. Therefore, CEC and DDC protocols may be unreliable for media device state detection, and/or at least difficult to maintain.

Example media device state detection techniques disclosed herein utilize an HDMI port of a monitored media device (e.g., TV) to detect an operational state of the monitored media device, such as whether the monitored media device is on or off. However, disclosed example media device state detection techniques do not rely on any particular protocol commands being implemented over the HDMI port to detect the operational state of the monitored media device (e.g., TV). Rather, a disclosed example media device state detector monitors the DDC bus of the HDMI port for activity. When the media device state detector finds a gap in activity of at least a threshold duration, the media device state detector sends a probe message (also referred to as a probe data frame) on the DDC bus. If the media device (e.g., the TV) is switched on (is in the on operational state) the inter-integrated circuit (I2C) electrical subsystem that implements the DDC bus will acknowledge the probe message regardless of whether the upper layer DDC protocol is implemented or has recognized the command represented by the probe message. However, if the media device (e.g., the TV) is switched off (is in the off operational state), the probe message will not be acknowledged by the I2C electrical subsystem. In example implementations disclosed herein, a media device user (e.g., a TV user) will not notice any consequences of the above media device state detection technique because the media device state detector implements a communication collision avoidance algorithm, as disclosed herein, which avoids communication collisions with other devices present on the DDC bus.

These and other example methods, apparatus, systems and articles of manufacture (e.g., physical storage media) to detect an operational state of a media device are disclosed in further detail below.

FIG. 1 is an illustration of an example audience measurement system constructed to include functionality to detect the operational state (e.g., the on/off state) of a media device in accordance with the teachings of this disclosure. In the illustrated example of FIG. 1, an example media presentation environment 102 includes example panelists 104, 106, an example media device 110 (also referred to as a media presentation device) that receives media from an example media source 112, and an example meter 114. The example meter 114 identifies the media presented by the example media device 110 and reports media monitoring information to an example central facility 190 of an example audience measurement entity via an example gateway 140 and an example network 180. In some examples, the meter 114 is referred to as a site meter, a device meter, an audience measurement device, etc. As disclosed in further detail below, the meter 114 is able to detect the operational state (e.g., the on/off state) of the media device 110 in accordance with the teachings of this disclosure.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the media device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media device 110 is a television. However, the example media device 110 can correspond to any type of audio, video and/or multimedia device capable of presenting media audibly and/or visually. In some examples, the media device 110 (e.g., a television) may communicate audio to another media device (e.g., an audio/video receiver) for output by one or more speakers (e.g., surround sound speakers, a sound bar, etc.). As another example, the media device 110 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media device 110 receives media from the media source 112. The media source 112 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media device 110 can correspond to a television and/or display device that supports the National Television Standards Committee (NTSC) standard, the Phase Alternating Line (PAL) standard, the Systéme Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media.

In examples disclosed herein, an audience measurement entity provides the meter 114 to the panelist 104, 106 (or household of panelists). The meter 114 may be installed by the panelist 104, 106 by simply powering the meter 114 and placing the meter 114 in the media presentation environment 102 and/or near the media device 110 (e.g., near a television set). In some examples, more complex installation activities may be performed such as, for example, affixing the meter 114 to the media device 110, electronically connecting the meter 114 to the media device 110, etc. The example meter 114 detects exposure to media and electronically stores monitoring information (e.g., a code detected with the presented media, a signature of the presented media, an identifier of a panelist that is present at the time of the presentation, a timestamp of the time of the presentation, etc.) of the presented media. The stored monitoring information is then transmitted back to the central facility 190 via the gateway 140 and the network 180. While the media monitoring information is transmitted by electronic transmission in the illustrated example of FIG. 1, the media monitoring information may additionally or alternatively be transferred in any other manner, such as, for example, by physically mailing the meter 114, by physically mailing a memory of the meter 114, etc.

The meter 114 of the illustrated example combines audience measurement data and audience identification data. For example, audience measurement data is determined by monitoring media output by the media device 110 and/or other media device(s), and audience identification data (also referred to as demographic data, people monitoring data, etc.) is determined from people monitoring data provided to the meter 114. Thus, the example meter 114 provides dual functionality of an audience measurement meter that is to collect audience measurement data, and a people meter that is to collect and/or associate demographic information corresponding to the collected audience measurement data.

For example, the meter 114 of the illustrated example collects media identifying information and/or data (e.g., signature(s), fingerprint(s), code(s), tuned channel identification information, time of exposure information, etc.) and people monitoring data (e.g., user identifiers, demographic data associated with audience members, etc.). The media identifying information and the people monitoring data can be combined to generate, for example, media exposure data (e.g., ratings data) indicative of amount(s) and/or type(s) of people that were exposed to specific piece(s) of media distributed via the media device 110. To extract media identification data, the meter 114 of the illustrated example of FIG. 1 monitors for watermarks (sometimes referred to as codes) included in the presented media and/or generates signatures (sometimes referred to as fingerprints) representative of the presented media Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Depending on the type(s) of metering the meter 114 is to perform, the meter 114 can be physically coupled to the media device 110 or may be configured to capture audio emitted externally by the media device 110 (e.g., free field audio) such that direct physical coupling to the media device 110 is not required. For example, the meter 114 of the illustrated example may employ non-invasive monitoring not involving any physical connection to the media device 110 (e.g., via Bluetooth® connection, WIFI® connection, acoustic sensing via one or more microphone(s) and/or other acoustic sensor(s), etc.) and/or invasive monitoring involving one or more physical connections to the media device 110 (e.g., via USB connection, a High Definition Media Interface (HDMI) connection, an Ethernet cable connection, etc.).

In examples disclosed herein, to monitor media presented by the media device 110, the meter 114 of the illustrated example senses audio (e.g., acoustic signals or ambient audio) output (e.g., emitted) by the media device 110. For example, the meter 114 processes the signals obtained from the media device 110 to detect media and/or source identifying signals (e.g., audio watermarks, audio signatures) embedded in and/or generated from portion(s) (e.g., audio portions) of the media presented by the media device 110. To, for example, sense ambient audio output by the media device 110, the meter 114 of the illustrated example includes an example acoustic sensor (e.g., a microphone). In some examples, the meter 114 may process audio signals obtained from the media device 110 via a direct cable connection to detect media and/or source identifying audio watermarks embedded in such audio signals.

To generate exposure data for the media, identification(s) of media to which the audience is exposed are correlated with people data (e.g., presence information) collected by the meter 114. The meter 114 of the illustrated example collects inputs (e.g., audience identification data) representative of the identities of the audience member(s) (e.g., the panelists 104, 106). In some examples, the meter 114 collects audience identification data by periodically and/or a-periodically prompting audience members in the media presentation environment 102 to identify themselves as present in the audience. In some examples, the meter 114 responds to predetermined events (e.g., when the media device 110 is turned on, a channel is changed, an infrared control signal is detected, etc.) by prompting the audience member(s) to self-identify. The audience identification data and the exposure data can then be complied with the demographic data collected from audience members such as, for example, the panelists 104, 106 during registration to develop metrics reflecting, for example, the demographic composition of the audience. The demographic data includes, for example, age, gender, income level, educational level, marital status, geographic location, race, etc., of the panelist.

In some examples, the meter 114 may be configured to receive panelist information via an input device such as, for example, a remote control, an Apple® iPad®, a cell phone, etc. In such examples, the meter 114 prompts the audience members to indicate their presence by pressing an appropriate input key on the input device. The meter 114 of the illustrated example may also determine times at which to prompt the audience members to enter information to the meter 114. In some examples, the meter 114 of FIG. 1 supports audio watermarking for people monitoring, which enables the meter 114 to detect the presence of a panelist-identifying metering device in the vicinity (e.g., in the media presentation environment 102) of the media device 110. For example, the acoustic sensor of the meter 114 is able to sense example audio output (e.g., emitted) by an example panelist-identifying metering device, such as, for example, a wristband, a cell phone, etc., that is uniquely associated with a particular panelist. The audio output by the example panelist-identifying metering device may include, for example, one or more audio watermarks to facilitate identification of the panelist-identifying metering device and/or the panelist 104 associated with the panelist-identifying metering device.

The meter 114 of the illustrated example communicates with a remotely located central facility 190 of the audience measurement entity. In the illustrated example of FIG. 1, the example meter 114 communicates with the central facility 190 via a gateway 140 and a network 180. The example meter 114 of FIG. 1 sends media identification data and/or audience identification data to the central facility 190 periodically, a-periodically and/or upon request by the central facility 190.

The example gateway 140 of the illustrated example of FIG. 1 can be implemented by a router that enables the meter 114 and/or other devices in the media presentation environment (e.g., the media device 110) to communicate with the network 180 (e.g., the Internet.)

In some examples, the example gateway 140 facilitates delivery of media from the media source(s) 112 to the media device 110 via the Internet. In some examples, the example gateway 140 includes gateway functionality such as modem capabilities. In some other examples, the example gateway 140 is implemented in two or more devices (e.g., a router, a modem, a switch, a firewall, etc.). The gateway 140 of the illustrated example may communicate with the network 126 via Ethernet, a digital subscriber line (DSL), a telephone line, a coaxial cable, a USB connection, a Bluetooth connection, any wireless connection, etc.

In some examples, the example gateway 140 hosts a Local Area Network (LAN) for the media presentation environment 102. In the illustrated example, the LAN is a wireless local area network (WLAN), and allows the meter 114, the media device 110, etc., to transmit and/or receive data via the Internet. Alternatively, the gateway 140 may be coupled to such a LAN.

The network 180 of the illustrated example can be implemented by a wide area network (WAN) such as the Internet. However, in some examples, local networks may additionally or alternatively be used. Moreover, the example network 180 may be implemented using any type of public or private network such as, but not limited to, the Internet, a telephone network, a local area network (LAN), a cable network, and/or a wireless network, or any combination thereof.

The central facility 190 of the illustrated example is implemented by one or more servers. The central facility 190 processes and stores data received from the meter(s) 114. For example, the example central facility 190 of FIG. 1 combines audience identification data and program identification data from multiple households to generate aggregated media monitoring information. The central facility 190 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 114 of the illustrated example provides a combination of media metering and people metering. The meter 114 of FIG. 1 includes its own housing, processor, memory and/or software to perform the desired media monitoring and/or people monitoring functions. The example meter 114 of FIG. 1 is a stationary device disposed on or near the media device 110. To identify and/or confirm the presence of a panelist present in the media presentation environment 102, the example meter 114 of the illustrated example includes a display. For example, the display provides identification of the panelists 104, 106 present in the media presentation environment 102. For example, in the illustrated example, the meter 114 displays indicia (e.g., illuminated numerical numerals 1, 2, 3, etc.) identifying and/or confirming the presence of the first panelist 104, the second panelist 106, etc. In the illustrated example, the meter 114 is affixed to a top of the media device 110. However, the meter 114 may be affixed to the media device in any other orientation, such as, for example, on a side of the media device 110, on the bottom of the media device 110, and/or may not be affixed to the media device 110. For example, the meter 114 may be placed in a location near the media device 110.

Figure 2:
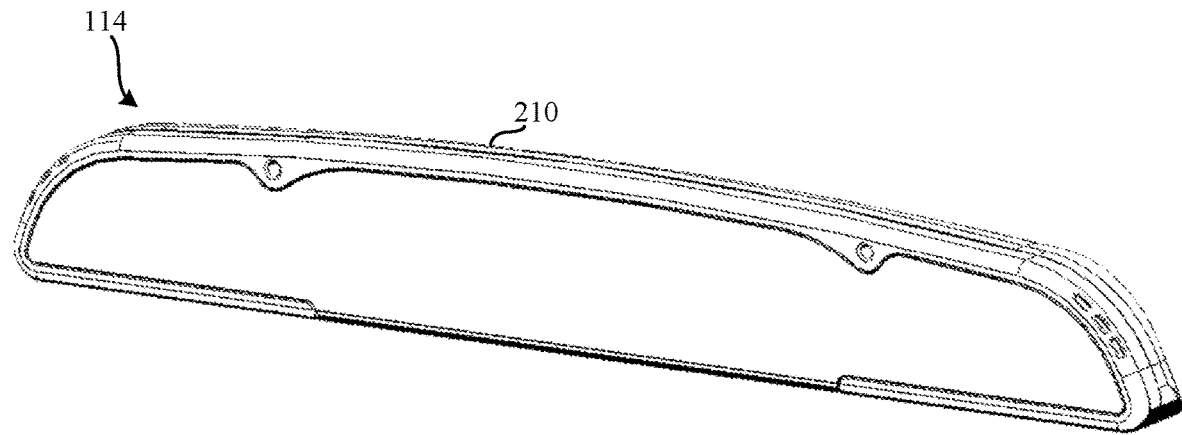
FIG. 2 is an example front view of the example meter of FIG. 1.

FIG. 2 is an example front view of the example meter 114 of FIG. 1. In the illustrated example of FIG. 2, the example meter 114 includes an example housing 210. In examples disclosed herein, the housing 210 is to be affixed to the media device 110. For example, the housing may be affixed to a top of the media device 110, may be affixed to a bottom of the media device 110, may be affixed to a side of the media device 110, etc. In some examples, the housing 210 of the meter 114 is not affixed to the media device 110. For example, the housing 210 may be placed in any other location within the media presentation environment 102 such that audio may be received by the meter 114.

Figure 3:
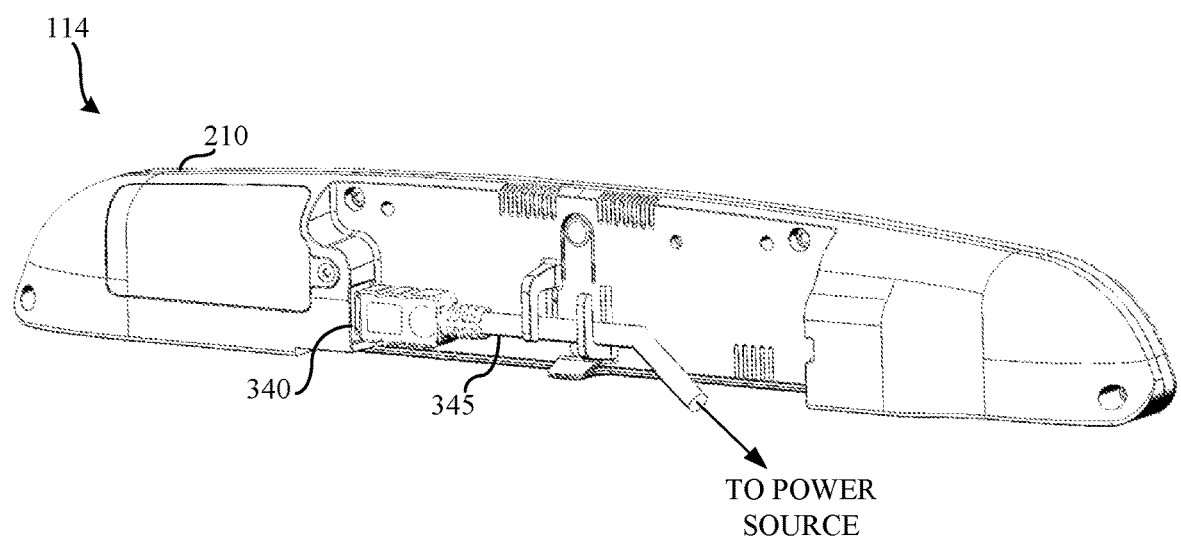
FIG. 3 is an example rear view of the example meter of FIG. 1.

FIG. 3 is an example rear view of the example meter 114 of FIG. 1. In the illustrated example of FIG. 3, the example housing 210 includes an example HDMI port 340. In the illustrated example of FIG. 3, the HDMI port 340 enables connection of the example meter 114 to an HDMI port of the media device 110 via an HDMI cable 345.

Figure 4:
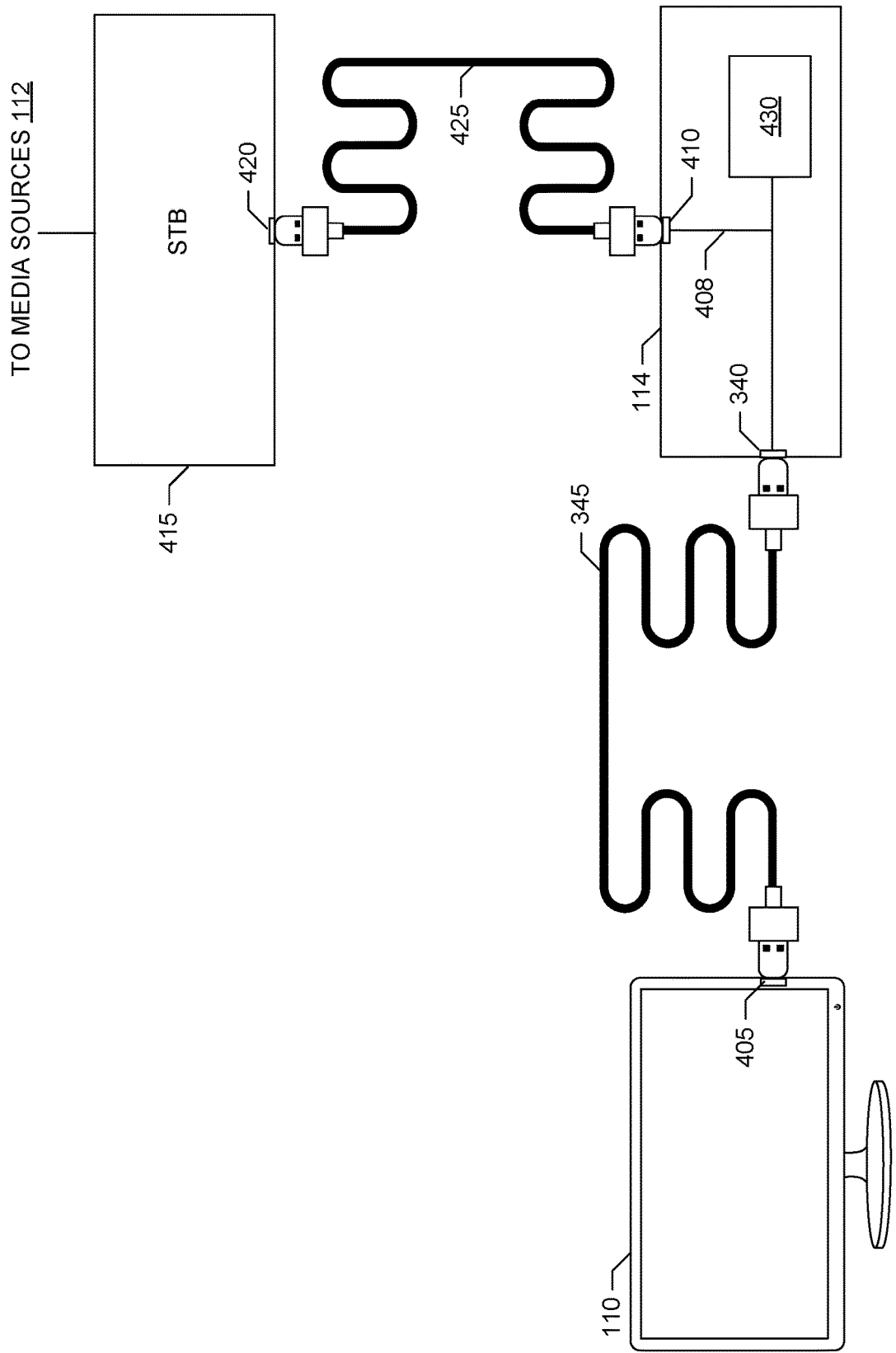
FIG. 4 is a block diagram of an example implementation of the meter of FIG. 1, which includes an example media device state detector implemented in accordance with the teachings of this disclosure.

FIG. 4 is a block diagram of an example implementation of the meter 114 of FIGS. 1-3, and further illustrates an example of interconnecting the meter 114 with the example media device 110. In the illustrated example of FIG. 4, the meter 114 is electrically connected to an example HDMI port 405 of the media device 110 via the HDMI port 340 of the meter 114 and the HDMI cable 345. In the illustrated example of FIG. 4, the meter 114 provides an example pass-through electrical connection 408 to another example HDMI port 410 of the meter 114. The port HDMI port 410 can be electrically connected to another media device, such as an example set-top box (STB) 415, via an example HDMI port 420 of the STB 415 and another example HDMI cable 425. In the illustrated example, STB 415 obtains media from one or more of the media sources 112. By providing the pass-through connection 408, the meter 114 can bridge the HDMI port 405 of media device 110 with the HDMI port 420 of the STB 415, thereby enabling the STB 415 to communicate with the media device 110 via their respective HDMI ports 420 and 405. Of course, the meter 114 is not limited to bridging the media device 110 with the STB 415, but can bridge the media device 110 with any other device having an HDMI port. (In other words, the STB 415 of FIG. 4 can be replaced with any device having an HDMI port.)

In the illustrated example, the meter 114 also includes an example media device state detector 430 implemented in accordance with teaching of this disclosure. The media device state detector 430 monitors the DDC bus of the HDMI port 405 of the media device 110 by monitoring the corresponding DDC bus pins of the pass-through connection 408. As described above, the media device state detector 430 monitors the DDC bus of the HDMI port 405 for activity. When the media device state detector 430 detects a gap in activity of at least a threshold duration (e.g., such as a gap of 4.2 seconds or some other duration, which may be a configuration parameter that can be provided to the media device state detector 430), the media device state detector 430 sends a probe message on the DDC bus of the HDMI port 405 of the media device 110. If the media device 110 is switched on (is in the on operational state) the I2C electrical subsystem of the media device 110, which is implementing the DDC bus of the HDMI port 405, will acknowledge the probe message regardless of whether any upper layer DDC software is implemented by the media device 110, or whether any such protocol software, if implemented, has recognized the command represented by the probe message. However, if the media device 110 is switched off (is in the off operational state), the probe message will not be acknowledged by the I2C electrical subsystem of the media device 110.

In some examples, the probe message is any message, such as an I2C data frame, sent to a particular address of the I2C electrical subsystem implementing the DDC bus of the HDMI port 405. In some examples, the contents of the probe message are immaterial. For example, the probe message can be an I2C data frame (with any data content) sent to address 0x74 (or some other address, which may be a configuration parameter that can be provided to the media device state detector 430) on the DDC bus of the HDMI port 405. In some such examples, if the media device 110 is in the on operational state, the I2C electrical subsystem of the media device 110 will acknowledge the probe message sent to address 0x74 (or some other address) by pulling down the voltage of an acknowledgment bit that follows the address (and an additional read-write bit) sent on the DDC bus of the HDMI port 405. If the media device 110 is in the off operational state, the I2C electrical subsystem of the media device 110 will not pull down the voltage of the acknowledgment bit that follows the address (and the additional read-write bit) on the DDC bus of the HDMI port 405 and, thus, will not acknowledge the message sent to address 0x74 (or some other address).

Figure 5:
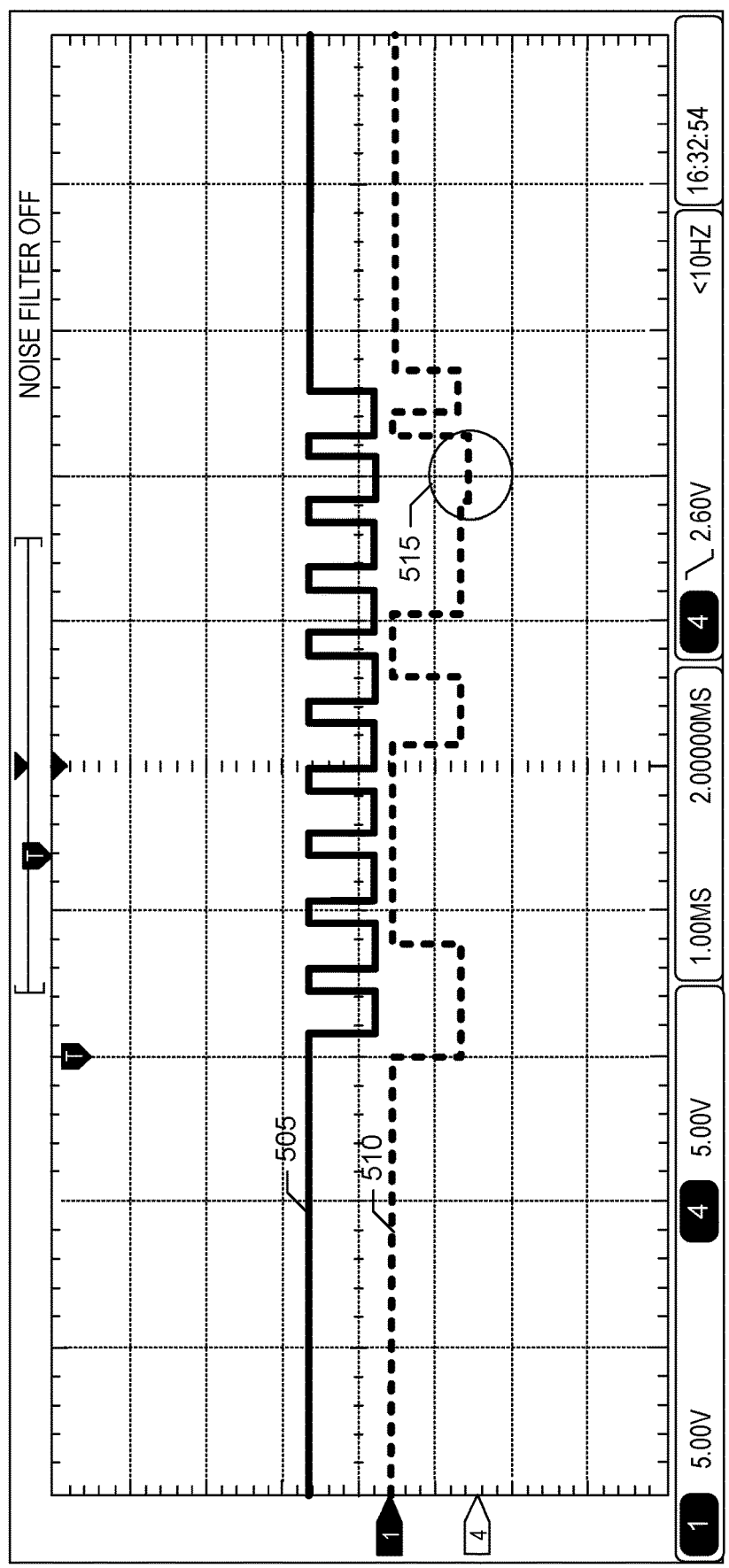
FIGS. 5-6 illustrate example signals monitored by the media device state detector of FIG. 4.
Figure 6:
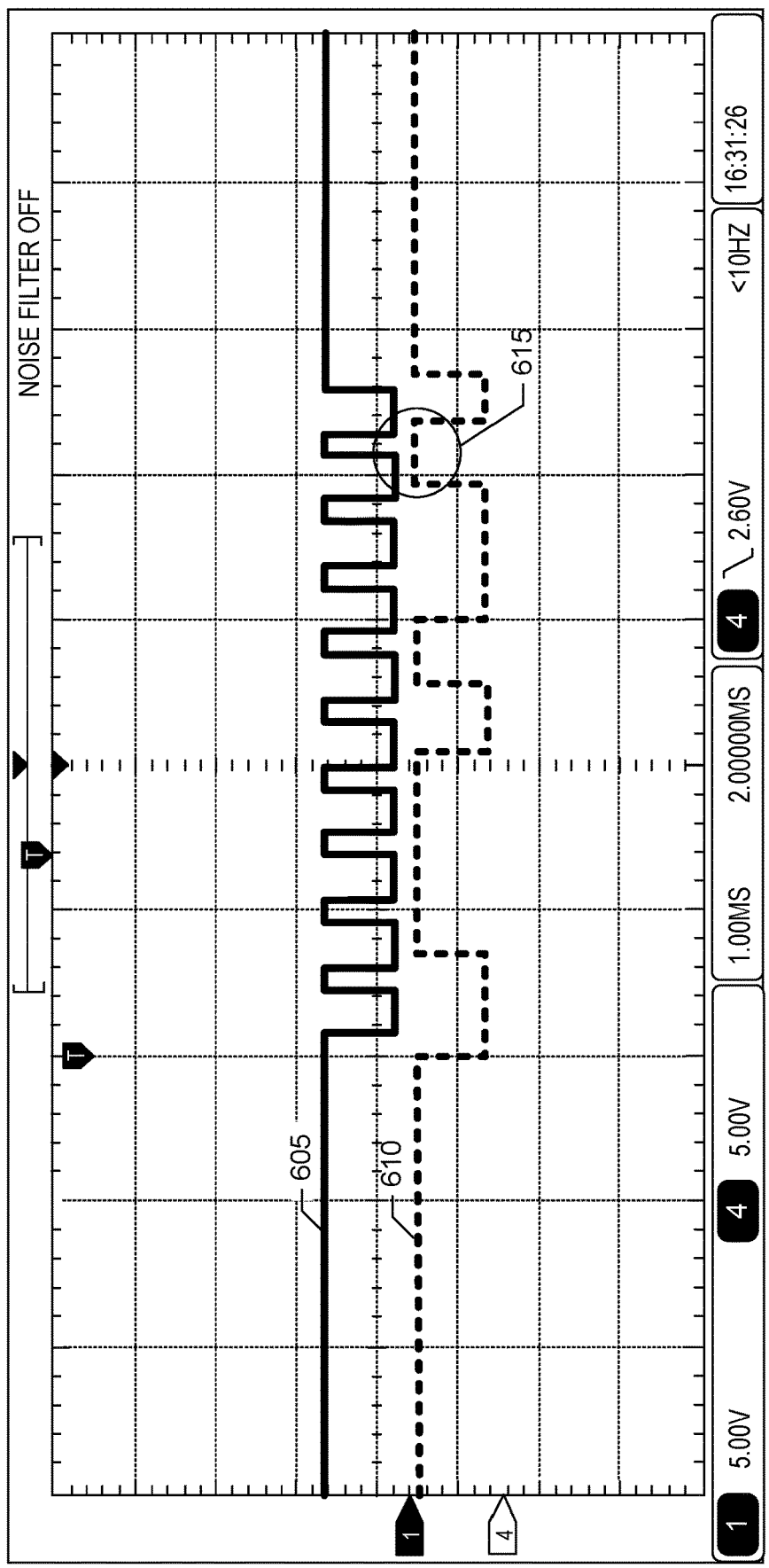

Examples of the acknowledgments monitored by the media device state detector 430 are illustrated in FIGS. 5-6. FIG. 5 illustrates an example of signals monitored by the media device state detector 430 on the DDC bus of the HDMI port 405 of the media device 110. The signals include an example clock voltage signal 505 sent on the clock pin of the DDC bus of the HDMI port 405 and an example data signal 510 sent on the data pin of the DDC bus of the HDMI port 405. In the illustrated example of FIG. 5, the clock voltage signal 505 and the example data signal 510 correspond to an example probe message sent by the media device state detector 430 on the DDC bus of the HDMI port 405. In the illustrated example, the probe message is an I2C data frame that includes a 7-bit address and an additional read-write bit, with one bit signaled at each pulse of the clock signal 505. In the illustrated example of FIG. 5, the media device 110 is turned on and acknowledges the probe message by pulling down the voltage of an acknowledgment bit of the data signal 510, which follows the 7-bit address and the additional read-write bit, and which is represented by the circle 515 in the FIG. 5.

FIG. 6 illustrates another example of signals monitored on the DDC bus of the HDMI port 405 by the media device state detector 430. The signals include an example clock voltage signal 605 sent on the clock pin of the DDC bus of the HDMI port 405 and an example data signal 610 sent on the data pin of the DDC bus of the HDMI port 405. In the illustrated example of FIG. 6, the clock voltage signal 605 and the example data signal 610 correspond to an example probe message sent by the media device state detector 430 on the DDC bus of the HDMI port 405. In the illustrated example, the probe message is an I2C data frame that includes a 7-bit address and an additional read-write bit, with one bit signaled at each pulse of the clock signal 605. In the illustrated example of FIG. 6, the media device 110 is turned off and does not pull down the voltage of an acknowledgment bit of the data signal 610, which follows the 7-bit address and the additional read-write bit, and which is represented by the circle 615 in the FIG. 6. Thus, in the illustrated example, the media device 110 does not acknowledge the probe message because the media device 110 turned off.

In the illustrated example of FIG. 4, the media device state detector 430 also implements a communication collision avoidance algorithm that avoids collisions on the DDC bus with other connected devices, such as the STB 415. An example of a communication collision avoidance algorithm implemented by the media device state detector 430 is described in connection with an example implementation of the media device state detector 430 illustrated in FIG. 7.

In some examples, the media device state detector 430 may or may not be a physical part of (e.g., implemented by/in) the example meter 114, as shown in the example of FIG. 4. When the detector 430 is not a physical part of the example meter 114, the detector 430 may be implemented as a stand-alone device. In some examples, such a stand-alone detector 430 includes HDMI ports to enable the detector 430 to be connected as a pass-through HDMI type of device between the media source (e.g., the STB 415) and monitored device (e.g., the media device 110) in a manner similar to that shown in FIG. 4, which enables the detector 430 to intercept the HDMI connection. In some such examples, the detector 430 is also connected to the example meter 114 by a wired connection or wireless connection, such as Bluetooth® (BT), BT low energy (BLE), Wi-Fi, etc., to send the detected operational state of the monitored media device 110 to the meter 114.

Figure 7:
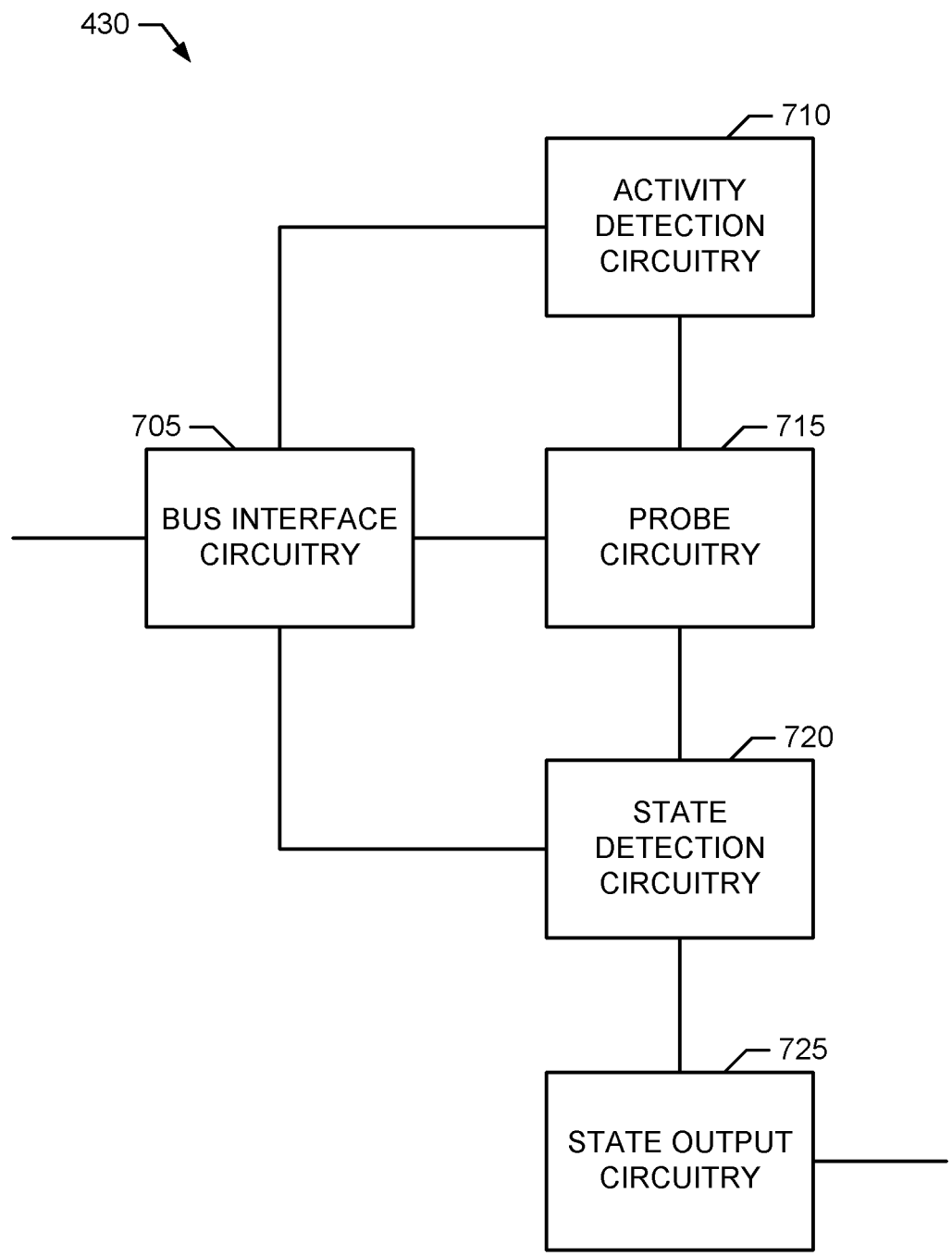
FIG. 7 is a block diagram of an example implementation of the media device state detector of FIG. 4.

An example implementation of the media device state detector 430 of FIG. 4 is illustrated in FIG. 7. The media device state detector 430 of FIG. 7 may be instantiated (e.g., creating an instance of, bring into being for any length of time, materialize, implement, etc.) by processor circuitry such as a central processing unit executing instructions. Additionally or alternatively, the media device state detector 430 of FIG. 7 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 7 may, thus, be instantiated at the same or different times. Some or all of the circuitry may be instantiated, for example, in one or more threads executing concurrently on hardware and/or in series on hardware. Moreover, in some examples, some or all of the circuitry of FIG. 7 may be implemented by one or more virtual machines and/or containers executing on the microprocessor.

The example media device state detector 430 of FIG. 7 includes example bus interface circuitry 705, example activity detection circuitry 710, example probe circuitry 715, example state detection circuitry 720, and example state output circuitry 725. In the illustrated example, the bus interface circuitry 705 is structured to interface (e.g., communicate, couple, etc.) with a first of multiple busses of an HDMI port, such as the DDC bus of the HDMI port 405 of the media device 110. For example, the bus interface circuitry 705 may include one or more of a connector, pins, leads, etc., to electrically couple with the pins of the monitored bus (e.g., the DDC bus) of the HDMI port (e.g., the HDMI port 405 of the media device 110).

In the illustrated example, the activity detection circuitry 710 is to monitor for activity on the monitored bus (e.g., the DDC bus) of the HDMI port (e.g., the HDMI port 405 of the media device 110). For example, as described above in connection with FIGS. 5-6, the activity detection circuitry 710 can monitor for activity (e.g., voltage changes) on the data and/or clock signals of the data and/or clock pins of the monitored bus (e.g., the DDC bus) of the HDMI port (e.g., the HDMI port 405 of the media device 110).

In the illustrated example, the probe circuitry 715 is to inject a probe message with a first address on the monitored bus (e.g., the DDC bus) of the HDMI port (e.g., the HDMI port 405 of the media device 110). The probe circuitry 715 is also to detect whether a response to the probe message is received on the monitored bus (e.g., the DDC bus of the HDMI port 405 of the media device 110). As described above, the probe message is used to detect the operational state (e.g., on or off) of the monitored media device (e.g., the media device 110). As also described above in connection with FIGS. 5-6, the probe message sent by the probe circuitry 715 can be an I2C data frame with a particular address (such as a 7-bit address with a value of 0x74 or some other address) that is sent on the DDC bus of the HDMI port. As further described above in connection with FIGS. 5-6, the response to the probe message can correspond to an acknowledgment of the probe message that is provided by an I2C electrical subsystem implementing the DDC bus of the HDMI port 405 of the media device 110. For example, in such examples, the probe circuitry 715 can determine the acknowledgment of the probe message is received when a voltage corresponding to an acknowledgment bit that follows the address of the probe message (and an additional read-write bit) is pulled down on the DDC bus of the HDMI port. In such examples, the probe circuitry 715 can determine the acknowledgment of the probe message has not been received when the voltage corresponding to the acknowledgment bit that follows the address of the probe message (and the additional read-write bit) is not pulled down on the DDC bus of the HDMI port.

In the illustrated example, the state detection circuitry 720 is to detect the operational state of the monitored media device (e.g., the media device 110) based on whether a response (e.g., an acknowledgment, as described above) to the probe message is received on the monitored bus (e.g., the DDC bus) of the HDMI port (e.g., the HDMI port 405 of the media device 110). For example, the state detection circuitry 720 can detect the operational state of the media device to be on when the response to the message is received on the first bus. In such examples, the state detection circuitry 720 can detect the operational state of the media device to be off when the response to the message is not received on the first bus.

In the illustrated example, the state output circuitry 725 is to output the detected operational state of the media device (e.g., the media device 110) to a meter, such as the meter 114. For example, the state output circuitry 725 can implement a wired connection or wireless connection, such as BT, BLE, Wi-Fi, etc., to send the detected operational state of the monitored media device (e.g., the media device 110) to a meter (e.g., the meter 114).

In the illustrated example of FIG. 7, the activity detection circuitry 710 and the probe circuitry 715 also implement a collision avoidance algorithm, as follows, to avoid collisions on the DDC bus with other connected devices (e.g., such as the STB 415). In some examples, the activity detection circuitry 710 monitors for activity on the monitored bus (e.g., the DDC bus) of the HDMI port (e.g., the HDMI port 405 of the media device 110), as described above. Then, in response to no activity being detected by the activity detection circuitry 710 on the monitored bus (e.g., the DDC bus of the HDMI port 405 of the media device 110) for at least a threshold duration, the activity detection circuitry 710 triggers the probe circuitry 715 to inject the probe message described above on the monitored bus (e.g., the DDC bus) of the HDMI port (e.g., the HDMI port 405 of the media device 110). In some examples, the threshold duration is a first threshold duration, and in response to no activity being detected by the activity detection circuitry 710 on the monitored bus (e.g., the DDC bus of the HDMI port 405 of the media device 110) for at least the first threshold duration after the activity detection circuitry 710 (or, more generally, the media device state detector 430) is initialized or a prior probe message was sent by the probe circuitry 715, the activity detection circuitry 710 triggers the probe circuitry 715 to inject the probe message described above on the monitored bus (e.g., the DDC bus) of the HDMI port (e.g., the HDMI port 405 of the media device 110). However, after activity is detected by the activity detection circuitry 710 on the monitored bus (e.g., the DDC bus of the HDMI port 405 of the media device 110), the probe circuitry 715 is triggered to inject the probe message described above on the monitored bus (e.g., the DDC bus of the HDMI port 405 of the media device 110) in response to no subsequent activity being detected by the activity detection circuitry 710 on the monitored bus (e.g., the DDC bus of the HDMI port 405 of the media device 110) for at least a second threshold duration. In some examples, the second threshold duration is shorter than the first threshold duration. For example, the first duration may be 4.2 seconds or some other value, whereas the second duration may be 0.2 seconds, or some other value.

In some examples, the media device state detector 430 includes means for monitoring activity of a first bus of an HDMI port of a media device. For example, the means for monitoring may be implemented by the activity detection circuitry 710. In some examples, the activity detection circuitry 710 may be implemented by machine executable instructions such as that implemented by one or more blocks of FIG. 8 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the activity detection circuitry 710 is implemented by other hardware logic circuitry, hardware implemented state machines, and/or any other combination of hardware, software, and/or firmware. For example, the activity detection circuitry 710 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the media device state detector 430 includes means for inject a message with a first address on a first bus of an HDMI port of a media device. For example, the means for injecting the message may be implemented by the probe circuitry 715. In some examples, the probe circuitry 715 may be implemented by machine executable instructions such as that implemented by one or more blocks of FIG. 8 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the probe circuitry 715 is implemented by other hardware logic circuitry, hardware implemented state machines, and/or any other combination of hardware, software, and/or firmware. For example, the probe circuitry 715 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the media device state detector 430 includes means for detecting an operational state of a media device. For example, the means for detecting the operational state may be implemented by the state detection circuitry 720. In some examples, the state detection circuitry 720 may be implemented by machine executable instructions such as that implemented by one or more blocks of FIG. 8 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the state detection circuitry 720 is implemented by other hardware logic circuitry, hardware implemented state machines, and/or any other combination of hardware, software, and/or firmware. For example, the state detection circuitry 720 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the media device state detector 430 includes means for outputting a detected operational state of a media device. For example, the means for outputting the detected operational state may be implemented by the state output circuitry 725. In some examples, the state output circuitry 725 may be implemented by machine executable instructions such as that implemented by one or more blocks of FIG. 8 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the state output circuitry 725 is implemented by other hardware logic circuitry, hardware implemented state machines, and/or any other combination of hardware, software, and/or firmware. For example, the state output circuitry 725 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the example meter 114 is illustrated in FIGS. 1-7, one or more of the elements, processes, and/or devices illustrated in FIGS. 1-7 may be combined, divided, re-arranged, omitted, eliminated, and/or implemented in any other way. Further, the example media device state detector 430, the example bus interface circuitry 705, the example activity detection circuitry 710, the example probe circuitry 715, the example state detection circuitry 720, the example state output circuitry 725 and/or, more generally, the example meter 114, may be implemented by hardware alone or by hardware in combination with software and/or firmware. Thus, for example, any of the example media device state detector 430, the example bus interface circuitry 705, the example activity detection circuitry 710, the example probe circuitry 715, the example state detection circuitry 720, the example state output circuitry 725 and/or, more generally, the example meter 114 could be implemented by processor circuitry, analog circuit(s), digital circuit(s), logic circuit(s), programmable processor(s), programmable microcontroller (s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example meter 114 may include one or more elements, processes and/or devices in addition to, or instead of, those illustrated in FIGS. 1-7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
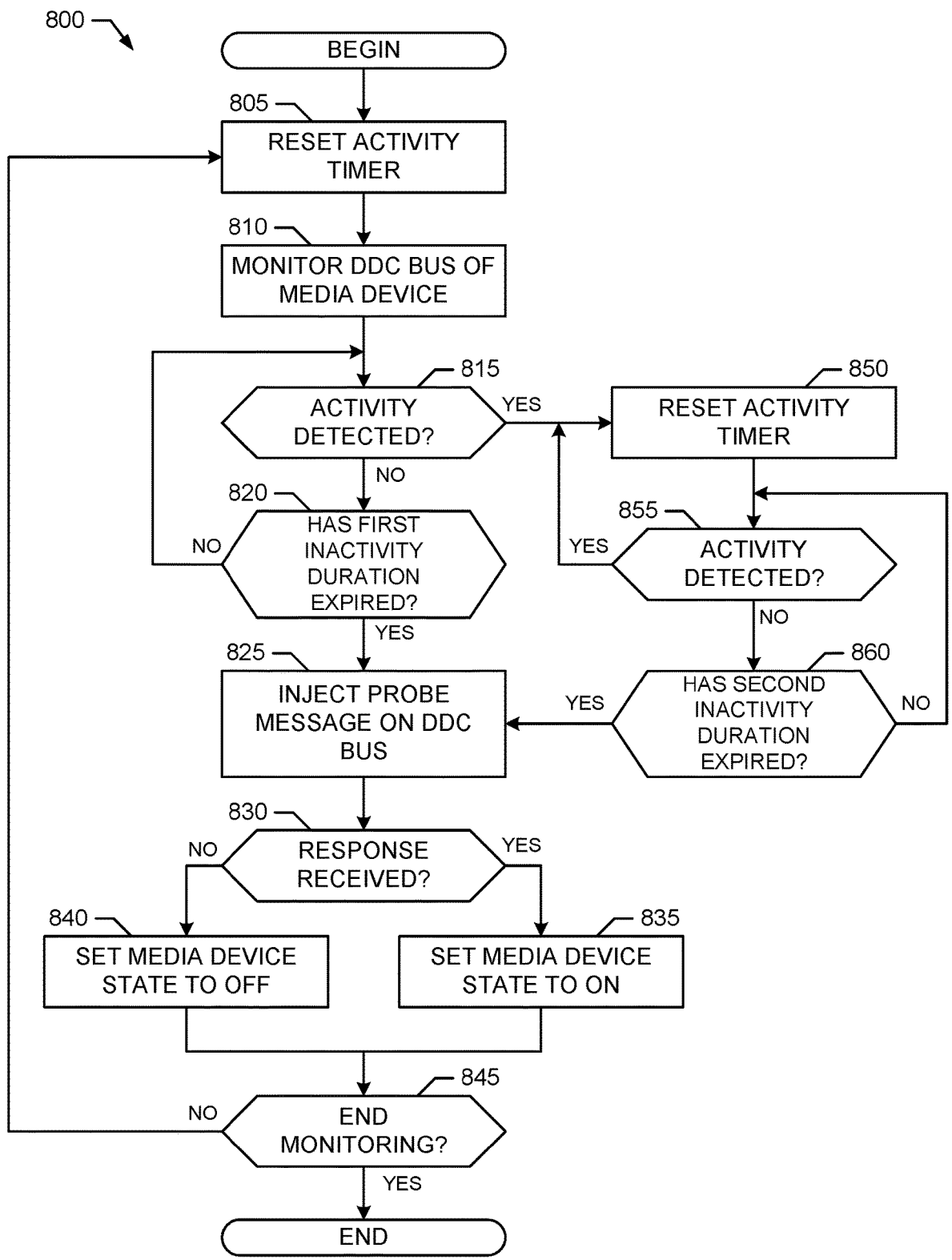
FIG. 8 is a flowchart representative of example machine readable instructions and/or example operations that may be executed by example processor circuitry to implement the example media device state detector of FIGS. 4 and/or 7.

A flowchart representative of example hardware logic circuitry, machine readable instructions, hardware implemented state machines, and/or any combination thereof for implementing the example meter 114, the example media device state detector 430, the example bus interface circuitry 705, the example activity detection circuitry 710, the example probe circuitry 715, the example state detection circuitry 720, and/or the example state output circuitry 725 is shown in FIG. 8. In these examples, the machine readable instructions may be one or more executable programs or portion(s) of an executable program for execution by a computer processor and/or processor circuitry, such as the processor circuitry 912 shown in the example processor platform 900 discussed below in connection with FIG. 9 and/or the example processor circuitry discussed below in connection with FIGS. 10 and/or 11. The one or more programs, or portion(s) thereof, may be embodied in software stored on one or more non-transitory computer readable storage media such as compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program or programs and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway) that may facilitate communication between a server and an endpoint client hardware device). Similarly, the non-transitory computer readable storage media may include one or more mediums located in one or more hardware devices. Further, although the example program(s) is(are) described with reference to the flowcharts illustrated in FIG. 8, many other methods of implementing the example meter 114, the example media device state detector 430, the example bus interface circuitry 705, the example activity detection circuitry 710, the example probe circuitry 715, the example state detection circuitry 720, and/or the example state output circuitry 725 may alternatively be used. For example, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed and/or instantiated by processor circuitry to implement the media device state detector 430 or, more generally, the meter 114 described above. With reference to the preceding figures and associated written descriptions, the machine readable instructions and/or operations 800 of FIG. 8 begin at block 805 at which the activity detection circuitry 710 of the media device state detector 430 resets an activity timer used by the media device state detector 430 to monitor for periods of inactivity on a monitored bus (e.g., the DDC bus) of an HDMI port (e.g., the HDMI port 405) of a media device (e.g., the media device 110). The activity timer can be any type of timer, clock, etc., and/or other circuitry implemented and/or accessible by the activity detection circuitry 710. In some examples, the instructions and/or operations 800 reach block 805 after the activity detection circuitry 710, the media device state detector 430 and/or the meter 114 is initialized, reset, powered-on, etc. Additionally or alternatively, in some examples, the instructions and/or operations 800 reach block 805 after a prior probe message has been injected on the monitored bus (e.g., the DDC bus) of an HDMI port (e.g., the HDMI port 405) of a media device (e.g., the media device 110) by the probe circuitry 715 of the media device state detector 430, and/or after an operation state of the media device (e.g., the media device 110) has been detected based on the prior probe message by the state detection circuitry 720 of the media device state detector 430.

At block 810, the activity detection circuitry 710 monitors for activity on the monitored bus (e.g., the DDC bus) of the HDMI port (e.g., the HDMI port 405 of the media device 110). For example, and as described above, the activity detection circuitry 710 can monitor for activity (e.g., voltage changes) on the data and clock signals of the data and clock pins of the monitored bus (e.g., the DDC bus) of the HDMI port (e.g., the HDMI port 405 of the media device 110).

At block 815, the activity detection circuitry 710 determines whether activity has been detected on the monitored bus (e.g., the DDC bus) of the HDMI port (e.g., the HDMI port 405 of the media device 110). If no activity is detected by the activity detection circuitry 710 (corresponding to the "NO" branch out of block 815), then at block 820 the activity detection circuitry 710 evaluates the activity timer to determine whether a first threshold inactivity duration has expired. For example, the first threshold inactivity duration can be set to 4.2 seconds or some other threshold duration, which may be a variable parameter that is configurable based on user input, a fixed, preset value, a compilation parameter, etc.

If the activity detection circuitry 710 determines the first threshold inactivity duration has not expired (corresponding to the "NO" branch out of block 820), control returns to block 815 at which the activity detection circuitry 710 continues to monitor for activity on the monitored bus (e.g., the DDC bus) of the HDMI port (e.g., the HDMI port 405 of the media device 110). However, if the activity detection circuitry 710 determines the first threshold inactivity duration has expired (corresponding to the "YES" branch out of block 820), then at block 825 the activity detection circuitry 710 triggers the probe circuitry 715 of the media device state detector 430 to inject a probe message onto the monitored bus (e.g., the DDC bus) of the HDMI port (e.g., the HDMI port 405 of the media device 110), as described above.

At block 830, the probe circuitry 715 determines whether a response to the injected probe message is received on the monitored bus (e.g., the DDC bus) of the HDMI port (e.g., the HDMI port 405 of the media device 110), as described above. If the probe circuitry 715 determine a response to the probe message has been received (corresponding to the "YES" branch out of block 830), then at block 835 the state detection circuitry 720 of the media device state detector 430 sets the detected operational state of the monitored media device (e.g., the media device 110) to on (or an on state, an on operational state, an active state, etc.). However, if the probe circuitry 715 determine a response to the probe message has not been received (corresponding to the "NO" branch out of block 830), then at block 840 the state detection circuitry 720 sets the detected operational state of the monitored media device (e.g., the media device 110) to off (or an off state, an off operational state, an inactive state, etc.). In some examples, at block 835 and 840, the state output circuitry 725 of the media device state detector 430 outputs the detected operational state of the monitored media device (e.g., the media device 110) to a meter (e.g., the meter 114).

After the operational state of the monitored media device (e.g., the media device 110) is detected by the state detection circuitry 720 (blocks 835 or 840), at block 845 the state detection circuitry 720 determines whether monitoring is to end. If monitoring is to end (corresponding to the "YES" branch out of block 845), then the machine readable instructions and/or operations 800 end. However, if monitoring is to continue (corresponding to the "NO" branch out of block 845), control returns to block 805 and blocks subsequent thereto.

Returning to block 815, if activity is detected by the activity detection circuitry 710 on the monitored bus (e.g., the DDC bus) of the HDMI port (e.g., the HDMI port 405 of the media device 110) (corresponding to the "YES" branch out of block 815), then at block 850 the activity detection circuitry 710 resets the activity timer. At block 855, the activity detection circuitry 710 continues to monitor for subsequent activity on the monitored bus (e.g., the DDC bus) of the HDMI port (e.g., the HDMI port 405 of the media device 110). If subsequent activity is detected by the activity detection circuitry 710 (corresponding to the "YES" branch out of block 855), control returns to block 850 at which the activity detection circuitry 710 resets the activity timer and continues to monitor for subsequent activity on the monitored bus (e.g., the DDC bus) of the HDMI port (e.g., the HDMI port 405 of the media device 110). However, if no subsequent activity is detected by the activity detection circuitry 710 (corresponding to the "NO" branch out of block 855), then at block 860 the activity detection circuitry 710 evaluates the activity timer to determine whether a second threshold inactivity duration has expired. For example, the second threshold inactivity duration can be set to 0.2 seconds or some other threshold duration, which may be a variable parameter that is configurable based on user input, a fixed, preset value, a compilation parameter, etc.

If the activity detection circuitry 710 determines the second threshold inactivity duration has not expired (corresponding to the "NO" branch out of block 860), control returns to block 855 at which the activity detection circuitry 710 continues to monitor for subsequent activity on the monitored bus (e.g., the DDC bus) of the HDMI port (e.g., the HDMI port 405 of the media device 110). However, if the activity detection circuitry 710 determines the second threshold inactivity duration has expired (corresponding to the "YES" branch out of block 860), then control proceeds to block 825 at which the activity detection circuitry 710 triggers the probe circuitry 715 of the media device state detector 430 to inject a probe message onto the monitored bus (e.g., the DDC bus) of the HDMI port (e.g., the HDMI port 405 of the media device 110), as described above. The machine readable instructions and/or operations 800 then proceed as described above.

Figure 9:
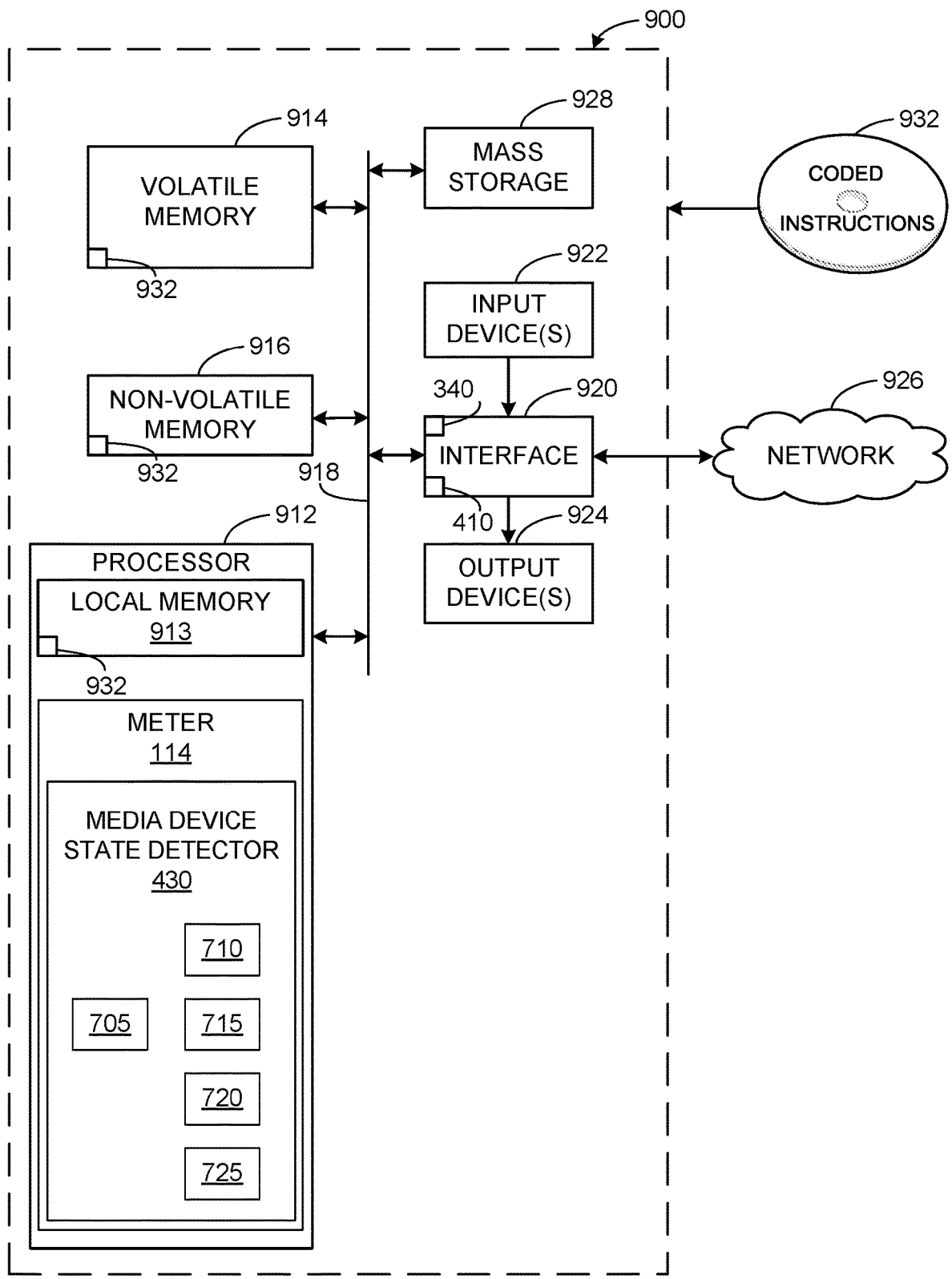
FIG. 9 is a block diagram of an example processor platform including processor circuitry structured to execute the example machine readable instructions and/or the example operations of FIG. 8 to implement the example media device state detector of FIGS. 4 and/or 7.

FIG. 9 is a block diagram of an example processor platform 900 structured to execute and/or instantiate the machine readable instructions and/or the operations of FIG. 8 to implement the example meter 114 and/or the example media device state detector 430 of FIGS. 1-7. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor 912 may be a semiconductor based (e.g., silicon based) device. In this example, the processor 912 implements the example bus interface circuitry 705, the example activity detection circuitry 710, the example probe circuitry 715, the example state detection circuitry 720, and/or the example state output circuitry 725 of the media device state detector 430.

The processor 912 of the illustrated example includes a local memory 913 (e.g., a cache, registers, etc.). The processor circuitry 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) can be implemented by, for example, an audio sensor, a microphone, a camera (still or video), a keyboard, a button, a mouse, a touchscreen, a track-pad, a trackball, a trackbar (such as an isopoint device), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speakers(s). The interface circuitry 920 of the illustrated example, thus, typically includes a graphics driver card, a graphics driver chip and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be via, for example, an Ethernet connection, a digital subscriber line (DSL) connection, a telephone line connection, a coaxial cable system, a satellite system, a line-of-site wireless system, a cellular telephone system, an optical connection, etc.

In some examples, the interface circuit 920 is configured to implement the example HDMI ports 340/or 410 of the meter 114.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 932 which may be implemented by the machine readable instructions of FIG. 8 may be stored in the mass storage device 928, in the volatile memory 914, in the non-volatile memory 916, in the local memory 913 and/or on a removable non-transitory computer readable storage medium, such as a CD or DVD 936.

Figure 10:
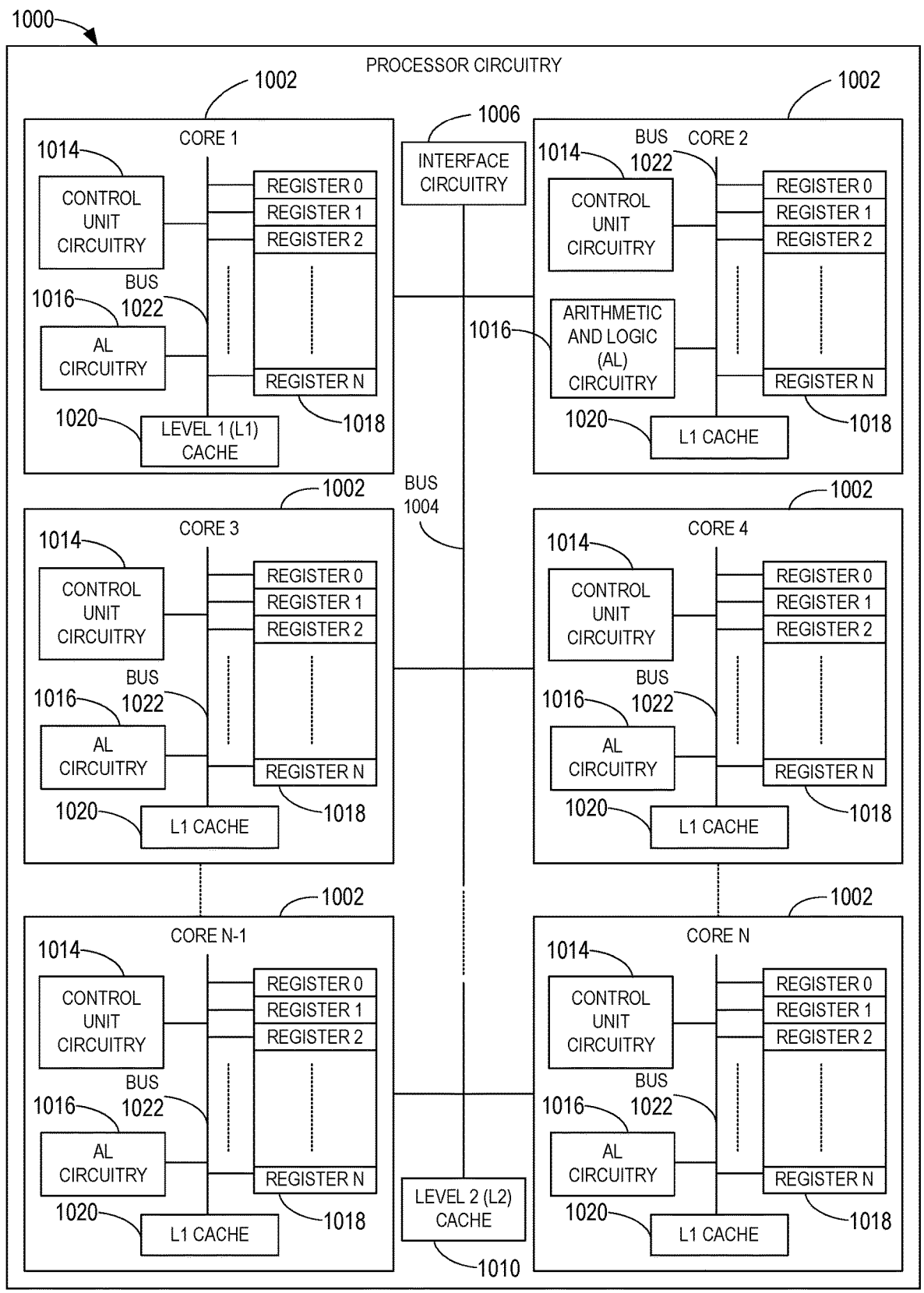
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. The general purpose microprocessor circuitry 1000 executes some or all of the machine readable instructions of the flowchart of FIG. 8 to effectively instantiate the circuitry of FIG. 7 as logic circuits to perform the operations corresponding to those machine readable instructions. In some such examples, the circuitry of FIG. 7 is instantiated by the hardware circuits of the microprocessor 1000 in combination with the instructions. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowchart of FIG. 8.

The cores 1002 may communicate by a first example bus 1004. In some examples, the first bus 1004 may implement a communication bus to effectuate communication associated with one(s) of the cores 1002. For example, the first bus 1004 may implement at least one of an Inter-Integrated Circuit (I2C) bus, a Serial Peripheral Interface (SPI) bus, a PCI bus, or a PCIe bus. Additionally or alternatively, the first bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2) cache) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1020 may implement at least one of an I2C bus, a SPI bus, a PCI bus, or a PCIe bus.

Figure 11:
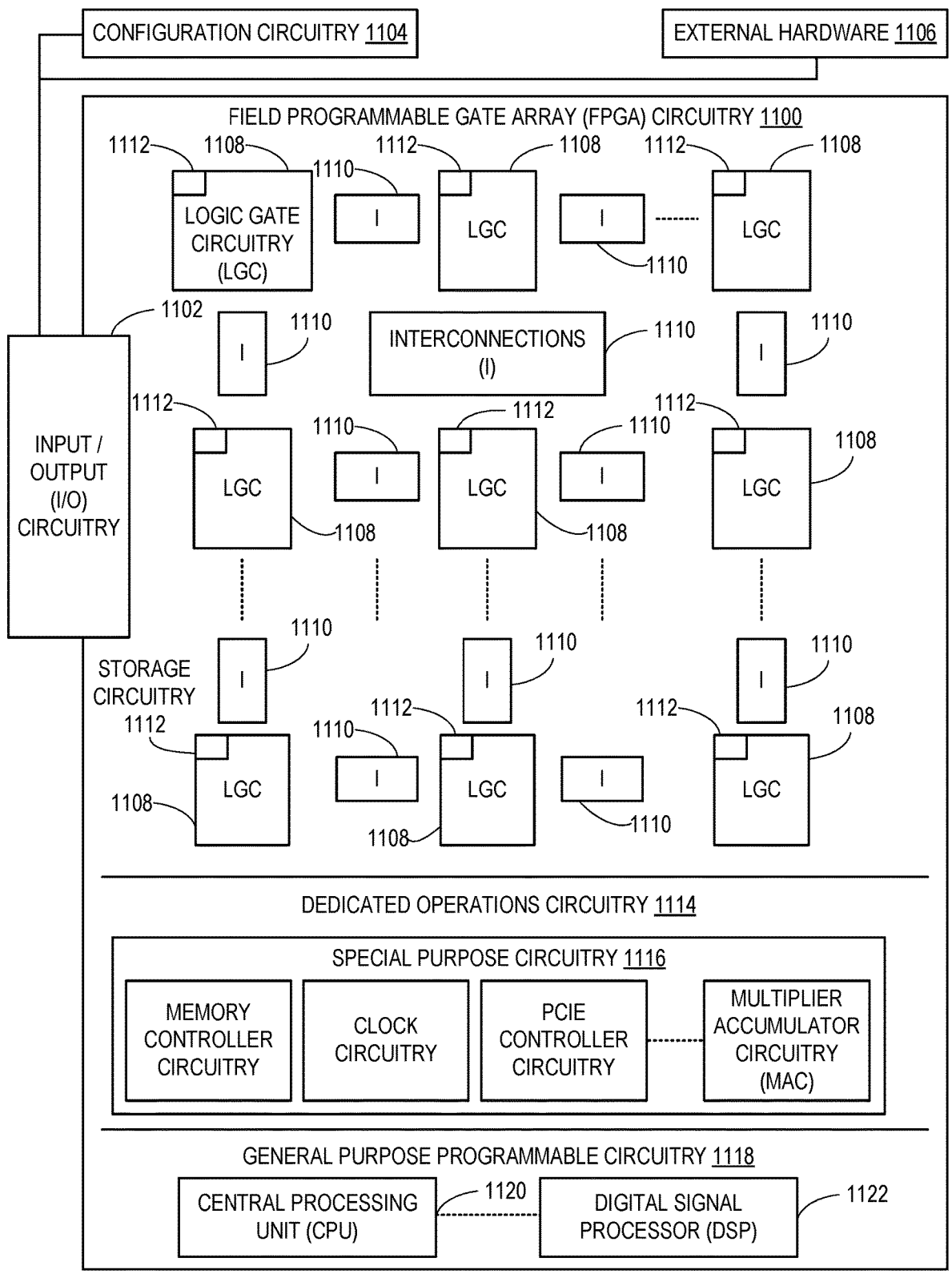
FIG. 11 is a block diagram of another example implementation of the processor circuitry of FIG. 9.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowchart of FIG. 8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowchart of FIG. 8. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowchart of FIG. 8. As such, the FPGA circuitry 1100 may be structured to effectively instantiate some or all of the machine readable instructions of the flowchart of FIG. 8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIG. 8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11 includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIG. 8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowchart of FIG. 8 may be executed by one or more of the cores 1002 of FIG. 10, a second portion of the machine readable instructions represented by the flowchart of FIG. 8 may be executed by the FPGA circuitry 1100 of FIG. 11, and/or a third portion of the machine readable instructions represented by the flowchart of FIG. 8 may be executed by an ASIC. It should be understood that some or all of the circuitry of FIG. 7 may, thus, be instantiated at the same or different times. Some or all of the circuitry may be instantiated, for example, in one or more threads executing concurrently and/or in series. Moreover, in some examples, some or all of the circuitry of FIG. 7 may be implemented within one or more virtual machines and/or containers executing on the microprocessor.

In some examples, the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
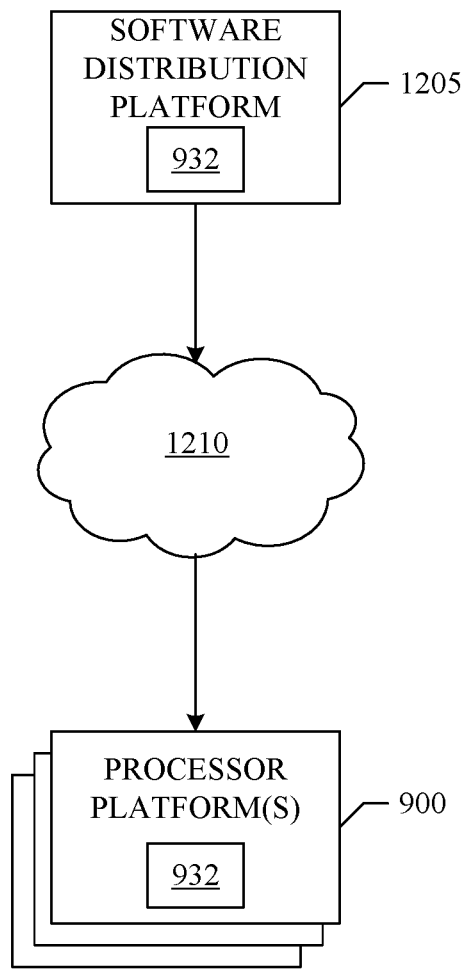
FIG. 12 is a block diagram of an example software distribution platform (e.g., one or more servers) to distribute software (e.g., software corresponding to the example machine readable instructions of FIG. 8) to client devices associated with end users and/or consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions 800 of FIG. 8, as described above. The one or more servers of the example software distribution platform 1205 are in communication with a network 1210, which may correspond to any one or more of the Internet and/or any of the example networks 180 and/or 926 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 800 of FIG. 8, may be downloaded to the example processor platform 900, which is to execute the machine readable instructions 932 to implement the example meter 114 and/or the example media device state detector 430. In some example, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that detect an operational state (such as an on/off state) of a media device. Disclosed systems, methods, apparatus, and articles of manufacture improve the efficiency of using a computing device by utilizing an HDMI port of a monitored media device (e.g., TV) to detect an operational state of the monitored media device without relying on any particular protocol commands being implemented over the HDMI port to detect the operational state of the monitored media device (e.g., TV). Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to detect an operational state of a media device are disclosed herein. Further examples and combinations thereof include the following.

Example 1 includes an apparatus to detect an operational state of a media device, the apparatus comprising activity detection circuitry to monitor for activity on a first bus of an (HDMI) port of the media device, probe circuitry to inject a message with a first address on the first bus in response to detection of no activity on the first bus for at least a threshold duration, and state detection circuitry to detect the operational state of the media device based on whether a response to the message is received on the first bus.

Example 2 includes the apparatus of example 1, wherein the state detection circuitry is to detect the operational state of the media device to be on when the response to the message is received on the first bus, and detect the operational state of the media device to be off when the response to the message is not received on the first bus.

Example 3 includes the apparatus of example 1, wherein the first bus is a display data channel (DDC) bus of the HDMI port.

Example 4 includes the apparatus of example 3, wherein the response corresponds to an acknowledgment of the message that is provided by an inter-integrated circuit (I2C) electrical subsystem of the media device, the I2C electrical subsystem to implement the DDC bus of the HDMI port.

Example 5 includes the apparatus of example 4, wherein the probe circuitry is to determine the acknowledgment of the message is received when a voltage corresponding to an acknowledgment bit that follows the first address and a read-write bit is pulled down on the DDC bus of the HDMI port.

Example 6 includes the apparatus of example 1, wherein the threshold duration is a first threshold duration, and after activity is detected by the activity detection circuitry on the first bus of the HDMI port of the media device, the probe circuitry is to inject the message with the first address on the first bus in response to detection of no subsequent activity on the first bus for at least a second threshold duration.

Example 7 includes the apparatus of example 6, wherein the second threshold duration is shorter than the first threshold duration.

Example 8 includes the apparatus of example 1, further including state output circuitry to output the detected operational state of the media device to a meter.

Example 9 includes an apparatus to detect an operational state of a media device, the apparatus comprising at least one memory, instructions in the apparatus, and processor circuitry to execute the instructions to at least monitor for activity on a first bus of an (HDMI) port of the media device, inject a message with a first address on the first bus in response to detection of no activity on the first bus for at least a threshold duration, and detect the operational state of the media device based on whether a response to the message is received on the first bus.

Example 10 includes the apparatus of example 9, wherein the processor circuitry is to detect the operational state of the media device to be on when the response to the message is received on the first bus, and detect the operational state of the media device to be off when the response to the message is not received on the first bus.

Example 11 includes the apparatus of example 9, wherein the first bus is a display data channel (DDC) bus of the HDMI port.

Example 12 includes the apparatus of example 11, wherein the response corresponds to an acknowledgment of the message that is provided by an inter-integrated circuit (I2C) electrical subsystem of the media device, the I2C electrical subsystem to implement the DDC bus of the HDMI port.

Example 13 includes the apparatus of example 12, wherein the processor circuitry is to determine the acknowledgment of the message is received when a voltage corresponding to an acknowledgment bit that follows the first address and a read-write bit is pulled down on the DDC bus of the HDMI port.

Example 14 includes the apparatus of example 9, wherein the threshold duration is a first threshold duration, and after activity is detected on the first bus of the HDMI port of the media device, the processor circuitry is to inject the message with the first address on the first bus in response to detection of no subsequent activity on the first bus for at least a second threshold duration.

Example 15 includes the apparatus of example 14, wherein the second threshold duration is shorter than the first threshold duration.

Example 16 includes the apparatus of example 9, wherein the processor circuitry is to output the detected operational state of the media device to a meter.

Example 17 includes at least one non-transitory computer readable medium comprising computer readable instructions that, when executed, cause at least one processor to at least monitor for activity on a first bus of an (HDMI) port of a media device, inject a message with a first address on the first bus in response to detection of no activity on the first bus for at least a threshold duration, and detect an operational state of the media device based on whether a response to the message is received on the first bus.

Example 18 includes the at least one non-transitory computer readable medium of example 17, wherein the instructions cause the at least one processor to detect the operational state of the media device to be on when the response to the message is received on the first bus, and detect the operational state of the media device to be off when the response to the message is not received on the first bus.

Example 19 includes the at least one non-transitory computer readable medium of example 17, wherein the first bus is a display data channel (DDC) bus of the HDMI port.

Example 20 includes the at least one non-transitory computer readable medium of example 19, wherein the response corresponds to an acknowledgment of the message that is provided by an inter-integrated circuit (I2C) electrical subsystem of the media device, the I2C electrical subsystem to implement the DDC bus of the HDMI port.

Example 21 includes the at least one non-transitory computer readable medium of example 20, wherein the instructions cause the at least one processor to determine the acknowledgment of the message is received when a voltage corresponding to an acknowledgment bit that follows the first address and a read-write bit is pulled down on the DDC bus of the HDMI port.

Example 22 includes the at least one non-transitory computer readable medium of example 17, wherein the threshold duration is a first threshold duration, and after activity is detected on the first bus of the HDMI port of the media device, the instructions cause the at least one processor to inject the message with the first address on the first bus in response to detection of no subsequent activity on the first bus for at least a second threshold duration.

Example 23 includes the at least one non-transitory computer readable medium of example 22, wherein the second threshold duration is shorter than the first threshold duration.

Example 24 includes the at least one non-transitory computer readable medium of example 17, wherein instructions cause the at least one processor to output the detected operational state of the media device to a meter.

Example 25 includes a method to detect an operational state of a media device, the method comprising monitoring for activity on a first bus of an (HDMI) port of the media device, injecting a message with a first address on the first bus in response to detection of no activity on the first bus for at least a threshold duration, and detecting the operational state of the media device based on whether a response to the message is received on the first bus.

Example 26 includes the method of example 25, wherein the detecting of the operational state of the media device includes detecting the operational state of the media device to be on when the response to the message is received on the first bus, and detecting the operational state of the media device to be off when the response to the message is not received on the first bus.

Example 27 includes the method of example 25, wherein the first bus is a display data channel (DDC) bus of the HDMI port.

Example 28 includes the method of example 27, wherein the response corresponds to an acknowledgment of the message that is provided by an inter-integrated circuit (I2C) electrical subsystem of the media device, the I2C electrical subsystem to implement the DDC bus of the HDMI port.

Example 29 includes the method of example 28, further including determining the acknowledgment of the message is received when a voltage corresponding to an acknowledgment bit that follows the first address and a read-write bit is pulled down on the DDC bus of the HDMI port.

Example 30 includes the method of example 25, wherein the threshold duration is a first threshold duration, and further including, in response to activity being detected on the first bus of the HDMI port of the media device, injecting the message with the first address on the first bus in response to detection of no subsequent activity on the first bus for at least a second threshold duration.

Example 31 includes the method of example 30, wherein the second threshold duration is shorter than the first threshold duration.

Example 32 includes the method of example 25, further including outputting the detected operational state of the media device to a meter.

Example 33 includes a system to detect an operational state of a media device, the system comprising means for monitoring for activity on a first bus of an (HDMI) port of the media device, means for injecting a message with a first address on the first bus in response to detection of no activity on the first bus for at least a threshold duration, and means for detecting the operational state of the media device based on whether a response to the message is received on the first bus.

Example 34 includes the system of example 33, wherein the means for detecting is to detect the operational state of the media device to be on when the response to the message is received on the first bus, and detect the operational state of the media device to be off when the response to the message is not received on the first bus.

Example 35 includes the system of example 33, wherein the first bus is a display data channel (DDC) bus of the HDMI port.

Example 36 includes the system of example 35, wherein the response corresponds to an acknowledgment of the message that is provided by an inter-integrated circuit (I2C) electrical subsystem of the media device, the I2C electrical subsystem to implement the DDC bus of the HDMI port.

Example 37 includes the system of example 36, wherein the means for injecting the message is to determine the acknowledgment of the message is received when a voltage corresponding to an acknowledgment bit that follows the first address and a read-write bit is pulled down on the DDC bus of the HDMI port.

Example 38 includes the system of example 33, wherein the threshold duration is a first threshold duration, and in response to activity being detected on the first bus of the HDMI port of the media device, the means for injecting the message is to inject the message with the first address on the first bus in response to detection of no subsequent activity on the first bus for at least a second threshold duration.

Example 39 includes the system of example 38, wherein the second threshold duration is shorter than the first threshold duration.

Example 40 includes the system of example 33, further including means for outputting the detected operational state of the media device to a meter.

Example 41 includes an apparatus to detect an operational state of a media device, the apparatus comprising interface circuitry to electrically couple with a first bus of an (HDMI) port of the media device, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate activity detection circuitry to monitor for activity on a first bus of an (HDMI) port of the media device, probe circuitry to inject a message with a first address on the first bus in response to detection of no activity on the first bus for at least a threshold duration, and state detection circuitry to detect the operational state of the media device based on whether a response to the message is received on the first bus.

Example 42 includes the apparatus of example 41, wherein the state detection circuitry is to detect the operational state of the media device to be on when the response to the message is received on the first bus, and detect the operational state of the media device to be off when the response to the message is not received on the first bus.

Example 43 includes the apparatus of example 41, wherein the first bus is a display data channel (DDC) bus of the HDMI port.

Example 44 includes the apparatus of example 43, wherein the response corresponds to an acknowledgment of the message that is provided by an inter-integrated circuit (I2C) electrical subsystem of the media device, the I2C electrical subsystem to implement the DDC bus of the HDMI port.

Example 45 includes the apparatus of example 44, wherein the probe circuitry is to determine the acknowledgment of the message is received when a voltage corresponding to an acknowledgment bit that follows the first address and a read-write bit is pulled down on the DDC bus of the HDMI port.

Example 46 includes the apparatus of example 41, wherein the threshold duration is a first threshold duration, and after activity is detected by the activity detection circuitry on the first bus of the HDMI port of the media device, the probe circuitry is to inject the message with the first address on the first bus in response to detection of no subsequent activity on the first bus for at least a second threshold duration.

Example 47 includes the apparatus of example 46, wherein the second threshold duration is shorter than the first threshold duration.

Example 48 includes the apparatus of example 41, further including state output circuitry to output the detected operational state of the media device to a meter.

The following claims are hereby incorporated into this Detailed Description by this reference. Although certain example systems, methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to detect an operational state of a media device, the apparatus comprising:
   at least one memory;
   instructions in the apparatus; and
   processor circuitry to execute the instructions to at least:
      monitor for activity on a first bus of an (HDMI) port of the media device;
      inject a message with a first address on the first bus in response to detection of no activity on the first bus for at least a threshold duration; and
      detect the operational state of the media device based on whether a response to the message is received on the first bus.

2. The apparatus of claim 1, wherein the processor circuitry is to:
   detect the operational state of the media device to be on when the response to the message is received on the first bus; and
   detect the operational state of the media device to be off when the response to the message is not received on the first bus.

3. The apparatus of claim 1, wherein the first bus is a display data channel (DDC) bus of the HDMI port.

4. The apparatus of claim 3, wherein the response corresponds to an acknowledgment of the message that is provided by an inter-integrated circuit (I2C) electrical subsystem of the media device, the I2C electrical subsystem to implement the DDC bus of the HDMI port.

5. The apparatus of claim 4, wherein the processor circuitry is to determine the acknowledgment of the message is received when a voltage corresponding to an acknowledgment bit that follows the first address and a read-write bit is pulled down on the DDC bus of the HDMI port.

6. The apparatus of claim 1, wherein the threshold duration is a first threshold duration, and after activity is detected on the first bus of the HDMI port of the media device, the processor circuitry is to inject the message with the first address on the first bus in response to detection of no subsequent activity on the first bus for at least a second threshold duration.

7. The apparatus of claim 6, wherein the second threshold duration is shorter than the first threshold duration.

8. The apparatus of claim 1, wherein the processor circuitry is to output the detected operational state of the media device to a meter.

9. A method to detect an operational state of a media device, the method comprising:
   monitoring for activity on a first bus of an (HDMI) port of the media device;
   injecting a message with a first address on the first bus in response to detection of no activity on the first bus for at least a threshold duration; and
   detecting the operational state of the media device based on whether a response to the message is received on the first bus.

10. The method of claim 9, wherein the detecting of the operational state of the media device includes:
    detecting the operational state of the media device to be on when the response to the message is received on the first bus; and
    detecting the operational state of the media device to be off when the response to the message is not received on the first bus.

11. The method of claim 9, wherein the first bus is a display data channel (DDC) bus of the HDMI port.

12. The method of claim 11, wherein the response corresponds to an acknowledgment of the message that is provided by an inter-integrated circuit (I2C) electrical subsystem of the media device, the I2C electrical subsystem to implement the DDC bus of the HDMI port.

13. The method of claim 12, further including determining the acknowledgment of the message is received when a voltage corresponding to an acknowledgment bit that follows the first address and a read-write bit is pulled down on the DDC bus of the HDMI port.

14. The method of claim 9, wherein the threshold duration is a first threshold duration, and further including, in response to activity being detected on the first bus of the HDMI port of the media device, injecting the message with the first address on the first bus in response to detection of no subsequent activity on the first bus for at least a second threshold duration.

15. The method of claim 14, wherein the second threshold duration is shorter than the first threshold duration.

16. The method of claim 9, further including outputting the detected operational State of the media device to a meter.

17. A system to detect an operational state of a media device, the system comprising:
means for monitoring for activity on a first bus of an (HDMI) port of the media device;
means for injecting a message with a first address on the first bus in response to detection of no activity on the first bus for at least a threshold duration; and
means for detecting the operational state of the media device based on whether a response to the message is received on the first bus.

18. The system of claim 17, wherein the means for detecting is to:
detect the operational state of the media device to be on when the response to the message is received on the first bus; and
detect the operational state of the media device to be off when the response to the message is not received on the first bus.

19. The system of claim 17, wherein the first bus is a display data channel (DDC) bus of the HDMI port.

20. The system of claim 19, wherein the response corresponds to an Acknowledgment of the message that is provided by an inter-integrated circuit (I2C) electrical subsystem of the media device, the I2C electrical subsystem to implement the DDC bus of the HDMI port.

21. The system of claim 20, wherein the means for injecting the message is to determine the acknowledgment of the message is received when a voltage corresponding to an acknowledgment bit that follows the first address and a read-write bit is pulled down on the DDC bus of the HDMI port.

22. The system of claim 17, wherein the threshold duration is a first threshold duration, and in response to activity being detected on the first bus of the HDMI port of the media device, the means for injecting the message is to inject the message with the first address on the first bus in response to detection of no subsequent activity on the first bus for at least a second threshold duration.

23. The system of claim 22, wherein the second threshold duration is shorter than the first threshold duration.

24. The system of claim 17, further including means for outputting the detected operational state of the media device to a meter.

* * * * *